United States Patent

Rüdiger et al.

[11] Patent Number: 5,836,235
[45] Date of Patent: Nov. 17, 1998

[54] PISTON FOR HYDRAULIC ACTUATING CYLINDERS

[75] Inventors: Eckhart Rüdiger, Ebern; Herbert Sauer, Pfarrweisach, both of Germany

[73] Assignee: Fahrzeugtechnik Ebern GmbH, Germany

[21] Appl. No.: 825,195

[22] Filed: Mar. 27, 1997

Related U.S. Application Data

[63] Continuation of Ser. No. 306,344, Sep. 15, 1994, abandoned.

[30] Foreign Application Priority Data

Sep. 15, 1993 [DE] Germany ................. 43 31 241.1

[51] Int. Cl.$^6$ .................. F16J 1/02; F16J 9/00
[52] U.S. Cl. ............... 92/178; 92/192; 92/248; 92/256
[58] Field of Search ............. 92/129, 172, 177, 92/178, 192, 240, 248, 249, 255, 256

[56] References Cited

U.S. PATENT DOCUMENTS

| | | |
|---|---|---|
| 1,775,892 | 9/1930 | DeSalvardi . |
| 2,251,259 | 8/1941 | Carmichael ................. 92/178 |
| 2,926,976 | 3/1960 | Bowerman et al. .......... 92/240 |
| 3,716,310 | 2/1973 | Guenther ................. 92/249 X |
| 4,807,577 | 2/1989 | Koutsouppidis ......... 92/178 X |
| 4,909,133 | 3/1990 | Taylor et al. ............... 92/212 |
| 4,944,215 | 7/1990 | Nimmo et al. ........... 92/249 X |
| 5,213,025 | 5/1993 | Rozer .................... 92/248 X |
| 5,245,913 | 9/1993 | Kato ..................... 92/178 X |
| 5,363,744 | 11/1994 | Pichler .................. 92/248 X |

FOREIGN PATENT DOCUMENTS

| | | | |
|---|---|---|---|
| 429670 | 9/1911 | France ........................ 92/128 |
| 3149628 | 7/1983 | Germany . |
| 594003 | 10/1946 | United Kingdom . |
| 955382 | 12/1962 | United Kingdom . |
| 1515445 | 6/1978 | United Kingdom . |
| 2012915 | 8/1979 | United Kingdom . |
| 2050172 | 1/1981 | United Kingdom . |
| 2079374 | 1/1982 | United Kingdom . |
| 2107822 | 5/1983 | United Kingdom ....... 92/128 |
| 2184657 | 7/1987 | United Kingdom . |
| 2224324 | 5/1990 | United Kingdom . |

*Primary Examiner*—Hoang Nguyen
*Attorney, Agent, or Firm*—Ostrolenk, Faber, Gerb & Soffen, LLP

[57] ABSTRACT

In order to reduce the weight and manufacturing cost of a piston for a hydraulic actuating cylinder, the piston, the piston rod and the external reinforcement cap are combined to form a unitary integral part. The unitary part is advantageously a single extrusion product. The piston is shaped so as to be able both to slide along the length of the inner cylinder wall, and to tilt upon deflection or lateral displacement of the piston rod in the bore of the cylinder, while still maintaining its hydraulic seal.

9 Claims, 2 Drawing Sheets

PISTON FOR HYDRAULIC ACTUATING CYLINDERS

This is a Continuation of Application Ser. No. 08/306,344 filed on Sep. 15, 1994, now abandoned.

BACKGROUND OF THE INVENTION

The present invention relates to a piston for use in a hydraulic actuating cylinder, and more particularly for use in a slave cylinder, such as a cylinder for actuating a friction clutch of a motor vehicle.

Federal Republic of Germany OS 31 49 628 (incorporated by reference) discloses a hydraulic cylinder, in which a piston rod provided with a spherical head is fastened in a piston by a holding member having resilient projections, thereby forming a ball joint between the piston rod and the piston. The purpose of the ball joint, as is well known, is to allow tilting of the piston rod, while the piston itself travels linearly within the cylinder and maintains a close cylindrical surface fit with the inner wall surface of the cylinder.

This construction has the disadvantage that a large number of individual parts are required, including the piston, the piston rod, and the ball end. The parts must be assembled together and then mounted, which leads to high manufacturing costs. In particular, the piston rod and ball end must be secured to the piston for swiveling movement by means of a separate retaining element. Further, the piston rod and ball end are made of metal, which results in the known device having a great weight.

SUMMARY OF THE INVENTION

The principal object of the present invention, therefore, is to develop a hydraulic cylinder of the aforementioned type which has reduced weight and manufacturing cost.

This object may be achieved by a piston for use in a hydraulic actuating cylinder, such as a clutch slave cylinder, wherein a piston, piston rod and reinforcement cap are combined to form a unitary integral part. Since the piston, piston rod and reinforcement cap are combined to form a unitary part, the material being preferably plastic, the cost of mounting can be reduced and a simple, inexpensive part obtained, which furthermore is low in weight and does not necessitate further mechanical treatments such as machining.

The piston rests against the inside wall of the cylinder. It is shaped and sized to be able to both move along the cylinder wall while maintaining a hydraulic seal, and to tilt upon deflection or displacement of the piston rod laterally in the bore of the cylinder.

Other features and advantages of the present invention will become apparent from the following description of an embodiment thereof, with reference to the accompanying drawings.

DETAILED DESCRIPTION OF AN EMBODIMENT OF THE INVENTION

Figure 1:
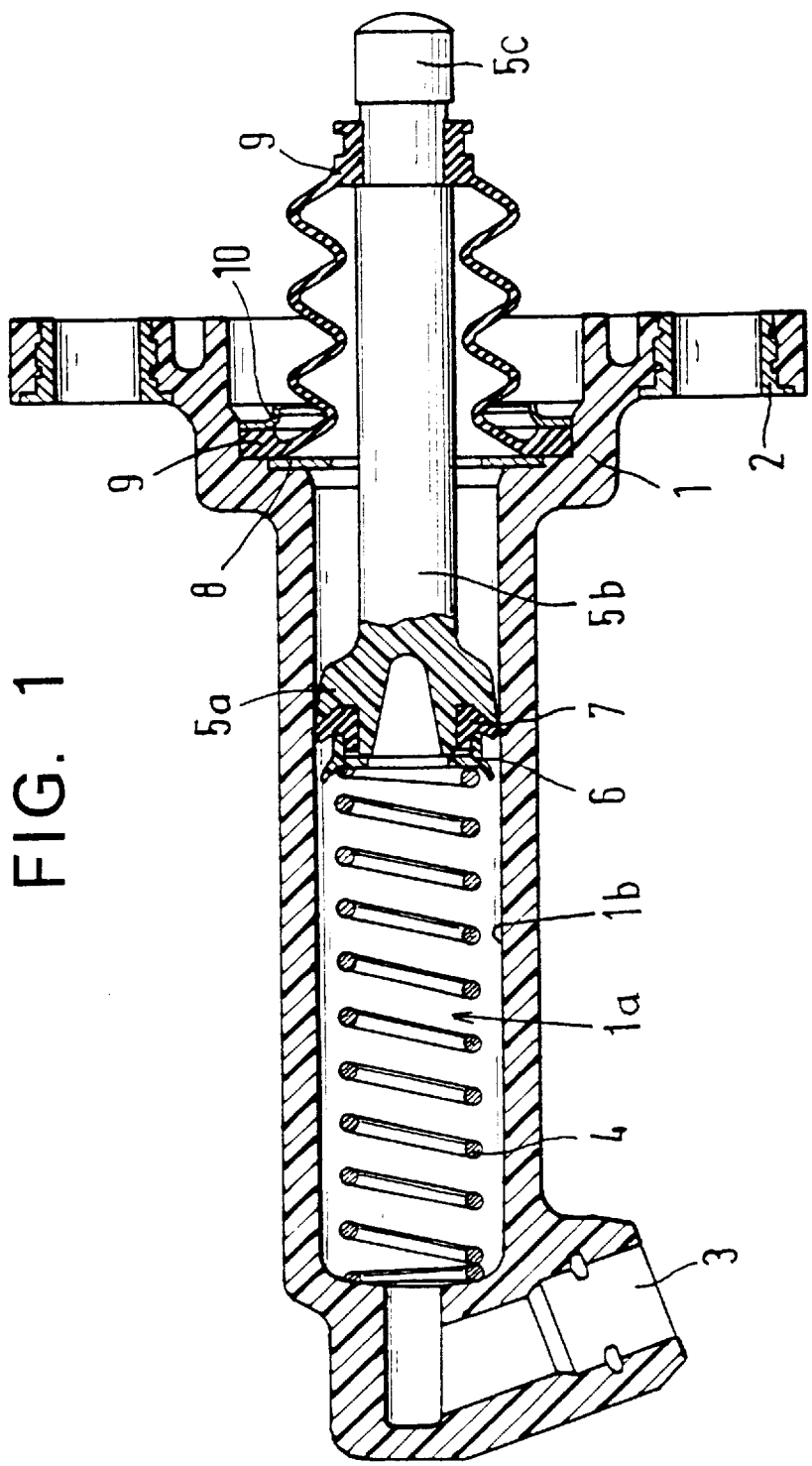
FIG. 1 shows a cylinder and piston according to an embodiment of the invention.

In an embodiment of the invention, shown in the figures, a piston 5a, a piston rod 5b, and a reinforcement cap 5c are formed as a unitary integral part. According to a preferred manufacturing method, the unitary part is injection-molded from plastic and therefore is low in weight. The unitary part emerges from the molding tool as a completely finished workpiece, which requires no further mechanical treatment such as machining, and can be mounted immediately in the cylinder housing 1.

The cylinder housing 1 is made of plastic and is provided with reinforcing bushings 2 at its attachment holes. A plug-type hydraulic connection 3 is developed at a distal end of the housing 1. The connection 3 communicates with a cylinder 1a having an inner wall 1b.

In the prior art device, a ball joint is required within the piston, to link the piston and the piston rod. The ball joint is needed to provide some relative tilting capability between the piston rod and the piston, because the piston itself is not free to tilt with respect to the inner cylinder wall.

Figure 2:
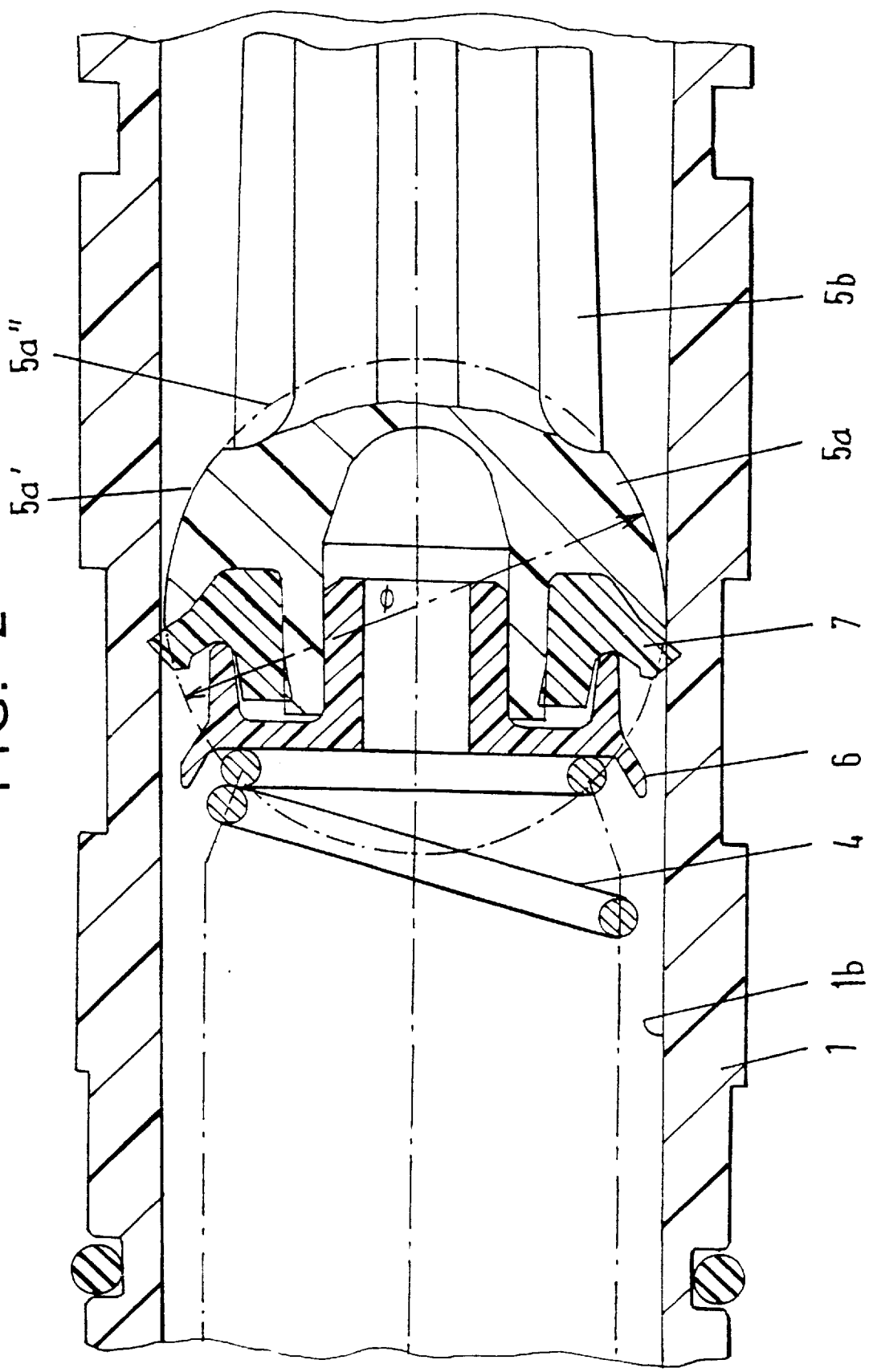
FIG. 2 is a detail view, partly in cross-section, of the piston.

In contrast to the prior art device, the unitary piston described herein has and needs no inner ball joint. To allow for tilting movement of the piston rod, which occurs during operation, the piston 5a itself is provided with a peripheral area having a spherical or approximately spherical curvature. As best seen in FIG. 2, the piston 5a has a peripheral surface 5a' which is spherical. The spherical shape is indicated by the dot-dash line 5a" in FIG. 2. The shape should be spherical enough to enable the piston 5a to tightly engage the inner cylinder wall 1b so as to make a hydraulic seal, to move along the wall 1b during its operation, and to tilt without breaking the seal.

Thus the contact between the outer circumference of the piston and the inner cylinder wall is a linear contact regardless of the tilting angle between the axis of the cylinder and the axis of the piston rod. The piston itself is able to tilt like a ball joint without losing its hydraulic seal with the inner cylinder wall.

A compression spring 4 is provided in the cylinder 1a and acts, via the piston 5, on the release lever of the clutch, for example (not shown) and serves to produce the necessary initial load for the clutch release bearing. At its proximal end, the spring 4 engages a spring washer 6, which serves to fasten a packing 7, in force-locked manner, against a distal end of the piston 5a. The packing can be made of rubber or any suitable elastomer.

A stop disk 8 is held in a proximal end of the housing 1 by a collar of an expandable accordion-shaped protective sleeve 9, which in turn is held in the housing 1 by a retaining element 10. The stop disk 8 prevents the piston from emerging from the housing upon the transport of the cylinder in the proximal direction.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A hydraulic actuating cylinder assembly, comprising:
 a cylinder housing having an inner wall defining a cylinder; and
 a piston in said cylinder housing, said piston comprising:
 a piston portion having a peripheral seat, a peripheral packing received in said peripheral seat for forming a hydraulic seal with said inner wall of said cylinder housing, wherein said peripheral seat has an unobstructed opening facing away from said piston rod portion so as to be able to receive said packing in an axial direction toward said piston rod portion;

a piston rod portion arranged for connecting the piston portion to further equipment outside the cylinder;

the piston portion becoming narrower from said peripheral seat to said piston rod portion for permitting the piston to have both movement along the cylinder and tilting movement within the cylinder while maintaining the hydraulic seal, wherein the piston portion linearly contacts the inner wall of the cylinder; and wherein the piston portion and piston rod portion together comprise a single unitary part 2. A piston as in claim 1, wherein the unitary part is a single extruded part.

3. A piston as in claim 1, further comprising a reinforcement cap on the piston rod portion, the reinforcement cap being comprised together with the piston portion and piston rod portion in said single unitary part.

4. A piston as in claim 2, wherein said single unitary part is a single extruded part.

5. A piston as in claim 1, wherein said single unitary part is an injection-molded part.

6. A piston as in claim 5, wherein said injection-molded part is made of plastic.

7. A piston as in claim 3, wherein said single unitary part is an injection-molded part.

8. A piston as in claim 7, wherein said injection-molded part is made of plastic.

9. A piston as in claim 1, wherein said single unitary part is unjointed such that said piston part and piston rod part maintain substantially constant relative positions.

* * * * *